United States Patent
Strunk et al.

[11] Patent Number: 6,137,497
[45] Date of Patent: Oct. 24, 2000

[54] POST TRANSFORMATION CLIPPING IN A GEOMETRY ACCELERATOR

[75] Inventors: Glenn W. Strunk, Fort Collins; Edmundo Rojas, Westminster; Theodore G. Rossin, Fort Collins, all of Colo.

[73] Assignee: Hewlett-Packard Company, Palo Alto, Calif.

[21] Appl. No.: 08/866,843

[22] Filed: May 30, 1997

[51] Int. Cl.[7] .................................................. G06T 15/30
[52] U.S. Cl. ........................ 345/434; 345/420; 345/421; 345/427; 345/435
[58] Field of Search ................................... 345/434, 427, 345/419, 435, 421, 420

[56] References Cited

U.S. PATENT DOCUMENTS

| | | | |
|---|---|---|---|
| 4,821,209 | 4/1989 | Hempel et al. | 364/518 |
| 4,888,712 | 12/1989 | Barkans et al. | 364/522 |
| 4,945,500 | 7/1990 | Deering | 364/522 |
| 4,958,305 | 9/1990 | Piazza | 364/522 |
| 5,003,497 | 3/1991 | Priem | 345/419 |
| 5,051,737 | 9/1991 | Akeley et al. | 340/747 |
| 5,079,719 | 1/1992 | Maillot | 395/134 |
| 5,193,148 | 3/1993 | Alcorn et al. | 345/434 |
| 5,404,428 | 4/1995 | Wu | 345/434 |
| 5,757,321 | 5/1998 | Billyard | 345/434 |

FOREIGN PATENT DOCUMENTS

2693012A1  6/1992  France .
2226219A  6/1990  United Kingdom .

*Primary Examiner*—Mark K. Zimmerman
*Assistant Examiner*—Kimbinh T. Nguyen

[57] ABSTRACT

A system and method for performing view clipping and model clipping of graphics primitives in a geometry accelerator of a computer graphics system. The method includes performing view clipping and model clipping of the graphics primitives in homogeneous window coordinates. The geometry accelerator includes a transform machine, a light machine, a clipping machine, and a plane equation machine. The transform machine receives vertex data defining a graphics primitive, in object coordinates, and transforms the vertex data into homogeneous window coordinates. The light machine receives the transformed vertex data from the transform machine and enhances the transformed vertex data by simulating lighting conditions of the graphics primitive. The light machine provides light enhanced transformed vertex data to the clipping machine. The clipping machine receives the light enhanced vertex data from the light machine and determines intersections of edges of the graphics primitive with view clipping planes and with any user specified model clipping planes. The resulting clipped vertex data from the clipping machine is provided to the plane equation machine. The plane equation machine calculates plane equations defining geometries formed by the clipped vertex data and provides the calculated plane equations to the computer graphics system for display.

48 Claims, 8 Drawing Sheets

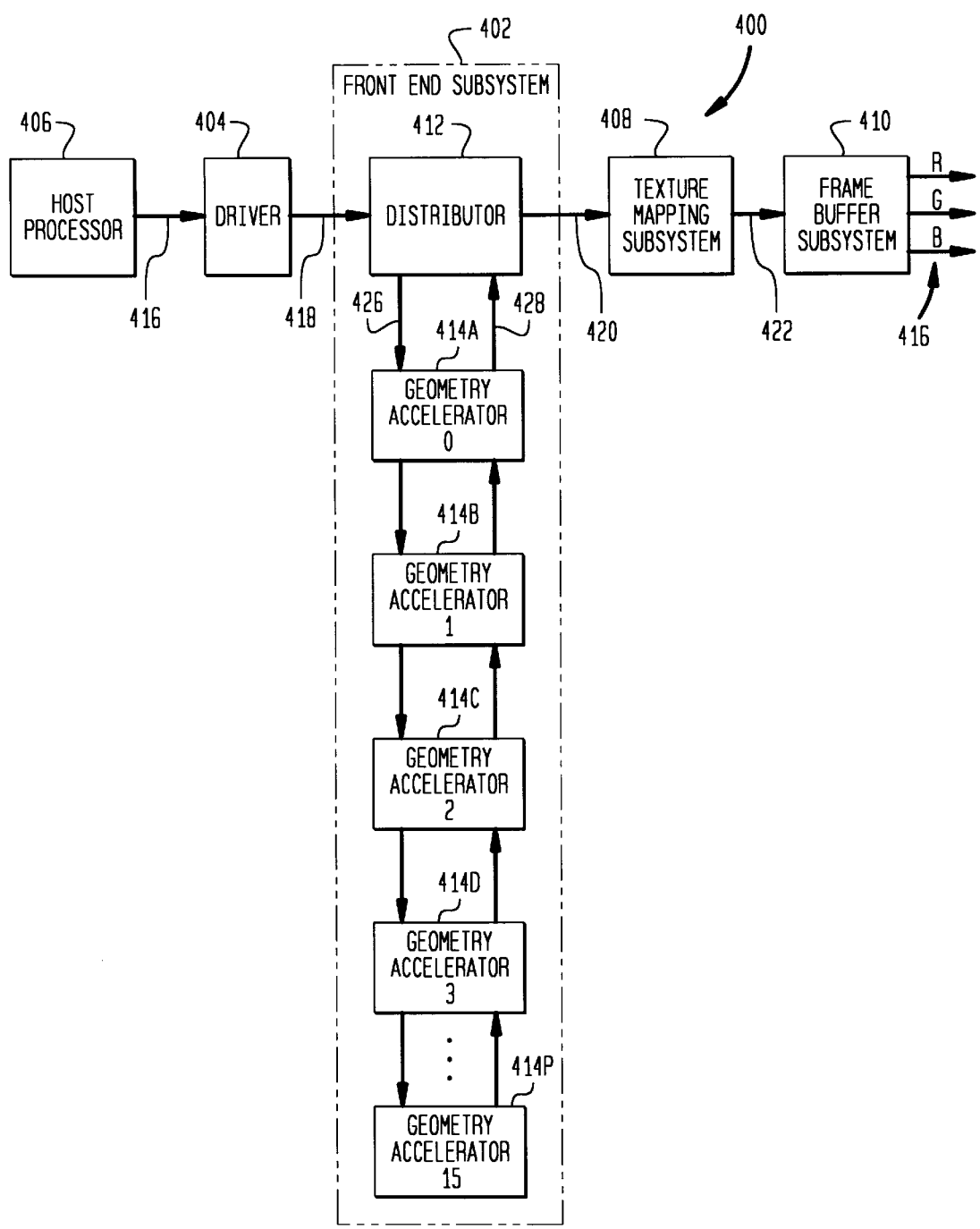

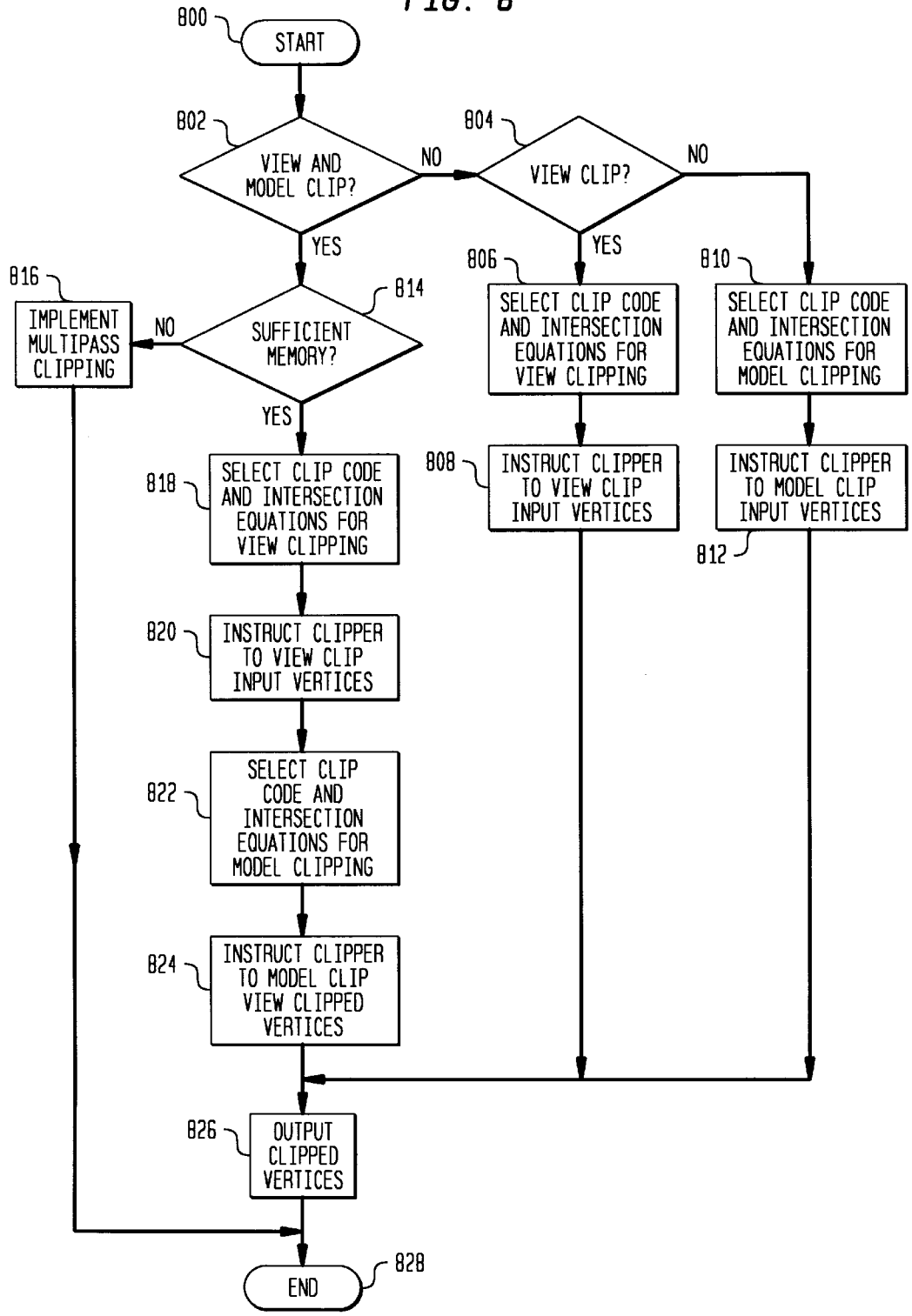

POST TRANSFORMATION CLIPPING IN A GEOMETRY ACCELERATOR

RELATED APPLICATIONS

The following application describes subject matter related to the present invention, and is filed on even date herewith: "Multi-Pass Clipping In A Geometry Accelerator," naming as inventors Theodore G. Rossin, Edmundo Rojas, and Glenn W. Strunk, now issued as U.S. Pat. No. 5,877,773.

BACKGROUND OF THE INVENTION

1. Field of the Invention

The present invention relates generally to geometry accelerators in computer graphics and animation systems and, more particularly, to geometry accelerators that include a clipping machine that clips graphics primitives to one or more boundaries.

2. Related Art

Computer graphics systems are commonly used for displaying two- and three-dimensional graphical representations of objects on a two-dimensional video display screen. Current computer graphics systems provide highly detailed representations and are used in a variety of applications.

In a typical computer graphics system an object or model to be represented on the display screen is broken down into a plurality of graphics primitives. Primitives are basic components of a graphics display and may include, for example, points, lines, vectors, and polygons such as triangles and quadrilaterals. Typically, a hardware/software scheme is implemented to render, or draw, the graphics primitives that represent a view of one or more objects being represented on the display screen.

Generally, the primitives of the three-dimensional object to be rendered are defined by a host computer in terms of primitive data. For example, when the primitive is a triangle, the host computer may define the primitives in terms of the coordinates (X, Y, Z, and W) of its vertices, as well as the red, green and blue and alpha (R, G, B and $\alpha$) color values of each vertex. Additional primitive data may be used in specific applications. Rendering hardware interpolates the primitive data to compute the display screen pixels that represent each primitive, and the R, G, and B color values for each pixel.

The basic components of a computer graphics system typically include a graphics interface and some specialized graphics system hardware. The graphics interface is typically provided to enable graphics applications located on the host computer to efficiently control the graphics system hardware. One of the more popular graphics interfaces is the OpenGL® standard, which provides an application program interface (API) to graphics system hardware. (OpenGL is a registered trademark of Silicon Graphics, Inc.).

The OpenGL software interface provides specific commands that are used to specify objects and operations to produce interactive, three-dimensional applications. OpenGL is a streamlined, hardware-independent interface designed to be implemented on many different hardware platforms. As such, in computer systems which support OpenGL, the operating systems and graphics application software programs can make calls to the computer graphics system according to the standardized API without knowledge of the underlying hardware configuration.

The OpenGL standard provides a complete library of low-level graphics manipulation commands for describing models of three-dimensional objects (the "GL" of OpenGL refers to "Graphics Library"). This standard was originally based on the proprietary standards of Silicon Graphics, Inc., but was later transformed into an open standard which is used in high-end graphics-intensive workstations, and, more recently, in high-end personal computers. The OpenGL standard is described in the OPENGL PROGRAMMING GUIDE, version 1.1 (1997), the OPENGL REFERENCE MANUAL, version 1.1 (1997), and a book by Segal and Akeley (of SGI) entitled THE OPENGL GRAPHICS SYSTEM: A SPECIFICATION (Version 1.0), all of which are hereby incorporated by reference in their entirety.

The graphics system hardware typically includes a geometry accelerator, a rasterizer, and a frame buffer. The graphics system may also include other hardware such as texture mapping hardware. The geometry accelerator receives primitive data from the host computer via the graphics interface. The primitive data defines the primitives that make up the model view to be displayed. The geometry accelerator performs transformations on the primitive data and may also perform such functions as lighting, clipping and plane equation calculations for each primitive. The output of the geometry accelerator, referred to as rendering data, is used by the rasterizer and the texture mapping hardware to generate final screen coordinate and color data for each pixel in each primitive. The pixel data from the rasterizer and the pixel data from the texture mapping hardware, if available, are combined and stored in the frame buffer for display on the video display screen.

One of the more complex operations that may be performed by a geometry accelerator is the clipping of graphics primitives. Clipping determines which portion of a graphics primitive is to be displayed in what is known as a "clip region." The clip region can be a two-dimensional area such as a window, or it can be a three-dimensional view volume. The primitives that are displayed in the clip region can be one-dimensional primitives (e.g., points or lines) or two-dimensional primitives (e.g., polygons).

The clipping of graphics primitives to a three-dimensional view volume is termed "view clipping". The three-dimensional view volume is defined by 6 orthogonal clipping planes, referred to herein as Xmax, Xmin, Ymax, Ymin, Zmax, Zmin. View clipping of primitives is required due to the finite size of the video display, but may also be required by downstream hardware rasterizers to prevent overflow of the rasterizer's internal counters. View clipping can also be used to increase performance of the graphics system, as further processing on primitives that lie outside the view volume need not be performed. In addition to performing view clipping, many graphics systems also perform "model clipping" of graphics primitives. Model clipping allows a user to specify one or more model clipping planes that may be used to further restrict the viewing volume or to remove portions of an object or model from view. Many graphics systems support 6 or more model clipping planes. By removing certain portions of the object or model from view, other areas of the model that were previously hidden from view can be visualized.

Although the clipping of graphics primitives may be performed within the geometry accelerator by means of a hardware-based clipping machine, it is conventionally implemented in software in the graphics system. One reason the clipping of graphics primitives has historically been performed in software rather than in hardware is that hardware implementations are generally more expensive, in terms of development time, cost, and risk, than software implementations, particularly given the rarity with which clipping operations have been performed. A further reason for performing clipping of graphics primitives in software rather than hardware is due to the amount of hardware that is needed to support clipping operations. For example, in conventional systems providing dedicated hardware within the geometry accelerator to perform clipping operations, two distinct clipping processors are provided. One clipping processor performs view clipping while the other performs model clipping. This dual-processor architecture is commonly used because view clipping and model clipping are conventionally required to be performed in different coordinate spaces.

For example, OpenGL specifies that view clipping and model clipping are performed in two different coordinate spaces. As shown diagrammatically in FIG. 1, OpenGL defines model clipping in "eye" coordinates 110 (eye space) and defines view clipping in "clip" coordinates 112 (clipping space). Graphics primitives (vertex data) and model clipping planes (m) are specified by the user in "object" coordinates 108 (object space), with model clipping planes being specified by the coefficients of the plane equation $Ax+By+Cz+Dw=0$. When a user specifies a model clipping plane, the model clipping plane (m) is transformed from object coordinates 108 to eye coordinates 110 by multiplying plane equation coefficients by the inverse transpose of the current modelview matrix ($M^{-T}$). After a graphics primitive is assembled in object coordinates 108, the vertex data defining the primitive is transformed into eye coordinates 110 where model clipping is defined, by multiplying the vertex data by the current modelview matrix (M) 100. The model clipping planes are applied to the transformed vertex data to generate model clipped vertex data in eye coordinates 110. The model clipped vertex data is then transformed from eye coordinates 110 to clip coordinates 112 where view clipping is performed, by multiplying the model clipped vertex data by the current projection matrix (P) 102. After performing view clipping, the view and model clipped vertex data is transformed to "window" coordinates 116 (window space) by performing perspective division 104 and multiplying the view and model clipped vertex data by the current viewport (V) and device (D) matrices 106. Typically this is performed by multiplying the view and model clipped vertex data by a concatenation of the current viewport (V) and device (D) matrices. The vertex data defining the view and model clipped primitive in window coordinates can then be displayed. However, because OpenGL specifies that view clipping and model clipping are performed in two different coordinate spaces, performing view and model clipping in hardware within a geometry accelerator according to the manner specified by OpenGL conventionally requires two distinct clipping processors.

Because of the amount of vertex data transformation that is required to view and model clip a graphics primitive, some graphics systems depart from the literal terms of the OpenGL standard. More sophisticated graphics systems reduce the amount of vertex data that is transformed by performing model clipping in object coordinates 108 rather than in eye coordinates 110. As in OpenGL, when a user specifies a model clipping plane, the model clipping plane (m) is transformed from object coordinates 108 to eye coordinates 110 by multiplying plane equation coefficients by the inverse transpose of the current modelview matrix ($M^{-T}$). After a graphics primitive is assembled in object coordinates 108, the model clipping plane is transformed back to object space 108 by multiplying the plane equation coefficients by the then current modelview matrix (M) 100. This step is performed because the modelview matrix used to transform the graphics primitive from object coordinates 108 to eye coordinates 110 may be different from the modelview matrix used to transform the model clip plane from object coordinates 108 to eye coordinates 110 (i.e., the current modelview matrix when the model clip plane was specified). The model clipping planes are applied to the vertex data in object space 108 to generate model clipped vertex data in object coordinates 108. The model clipped vertex data is then transformed from object coordinates 108 to clip coordinates 112 where view clipping is defined, by multiplying the model clipped vertex data by the current modelview matrix (M) 100 and the current projection matrix (P) 102. Conventionally this is performed by multiplying the model clipped vertex data by a concatenation of the current modelview matrix (M) 100 and the current projection matrix (P) 102 (MP). After performing view clipping in clip coordinates 112, the view and model clipped vertex data is transformed to window coordinates 116 by performing perspective division 104 and multiplying the view and model clipped vertex data and by a concatenation of the current viewport (V) and device (D) matrices 106 (VD). The vertex data defining the view and model clipped primitive in window coordinates 116 can then be displayed.

An advantage of this more sophisticated method is that model clipping planes, which are less frequently encountered than vertex data, are back transformed once, rather than having to forward transform all vertex data, some or all of which may be clipped away by the model clip planes. Thus, only the vertex data that remains after performing model clipping needs to be transformed, thereby increasing efficiency. However, because model clipping and view clipping are still performed in two different coordinate spaces, this more sophisticated method still requires two different clipping processors to perform both view and model clipping in hardware within the geometry accelerator.

However, as noted, the clipping of graphics primitives is only a subset of those functions that a geometry accelerator may perform. Frequently, clipping does not need to be performed at all. Moreover, the amount of surface area consumed by two distinct clipping processors within a geometry accelerator is quite large. Thus, performing view and model clipping within the geometry accelerator often requires sacrificing some other, more frequently performed operation, such as light enhancement, plane equation calculation, etc. Accordingly, for each of the foregoing reasons, the clipping of graphics primitives is conventionally performed in software by the graphics system, rather than in hardware within a geometry accelerator.

SUMMARY OF THE INVENTION

The present invention is a geometry accelerator including a clipping machine that performs view clipping and model clipping in the same coordinate space. Significantly, this reduces the number of clipping processors that are required to perform both view and model clipping functions within the geometry accelerator. This enables the same clipping processor to be used to perform view clipping and model clipping. This reduction in hardware enables clipping to be performed in hardware, rather than software, without sacrificing other functions that may also be performed by the geometry accelerator. This, in turn, results in increased speed and efficiency of the computer graphics systems.

Advantageously, by performing view clipping and model clipping within the geometry accelerator, other functions that are generally performed prior to view clipping and model clipping can also be performed within the geometry accelerator. For example, conventional computer graphics systems may include a geometry accelerator that performs light enhancement and plane equation calculations. Due to the amount of primitive data that is processed by the geometry accelerator, these functions are generally performed in a pipeline, whereby the output of one function provides the input data for the next function. However, conventional graphics systems perform view clipping and model clipping in software, rather than hardware. Because clipping is performed by software, those functions that are performed prior to clipping, such as transformation, can not also be performed in hardware without stalling the pipeline. However, by performing view and model clipping in hardware within the geometry accelerator, embodiments of the present invention permit other functions that are performed prior to clipping to be implemented in hardware, thereby dramatically increasing the performance of the graphics system.

According to an aspect of the present invention, vertex data defining graphics primitives is transformed to homogeneous window coordinates where view clipping and model clipping are performed. Thus, each vertex of a graphics primitive is multiplied by a concatenation of the current modelview (M), projection (P), Viewport (V), and device (D) matrices (i.e., a MPVD matrix) to transform the vertex data into homogeneous window coordinates, regardless of whether the vertex may be clipped away by a clipping plane. However, in contrast to conventional graphics systems, this transformation is performed in hardware by a transform machine, rather than by software. As a result, performance increases achieved by performing vertex transformation in hardware significantly outweigh the additional amount of vertex data that is transformed.

According to another aspect of the present invention, model clipping planes are transformed from eye coordinates to homogeneous window coordinates by multiplying model clipping plane coefficients by the inverted and transposed concatenated PVD matrix $((PVD)^{-T})$. Transforming a few model clipping planes into homogeneous window coordinates consumes less time and resources than transforming many vertices from object space to eye space, and then from eye space, to window space as specified in OpenGL. This is because the number of model clipping planes that are specified by a user are generally significantly less than the number of vertices to be processed. Thus, by transforming model clipping planes into homogeneous window coordinates and performing model clipping in homogeneous window space, further performance benefits over conventional graphics systems are realized.

According to a further aspect of the present invention, performing view clipping and model clipping in homogeneous window coordinates requires fewer transformations than conventional graphics systems. OpenGL specifies transforming model clipping planes and vertex data into eye coordinates, thus requiring two different transformations. After performing model clipping, OpenGL specifies another transformation into clip coordinates, and then finally another transformation into window coordinates. Thus at least four transformations are required in OpenGL. More sophisticated graphics systems transform model clipping planes to eye coordinates, and then transform the model clipping planes from eye coordinates back to object coordinates. After performing model clipping, model clipped vertex data is transformed into clip coordinates, and then the view and model clipped vertex data is finally transformed into window coordinates, thus also requiring at least four transformations. According to the present invention, vertex data is transformed once into homogeneous window coordinates, and model clipping planes are transformed twice from object coordinates to eye coordinates, and then to homogeneous window coordinates. Thus, the present invention requires at least one less transformation to clip and display a geometry.

A further advantage of the present invention is that the present invention is independent of the particular type of clipping technique that is used to perform view clipping and model clipping. For example, the clipping processor may use Cohen-Sutherland line clipping, parametric line clipping, Weiler polygon clipping, Liang-Barsky polygon clipping, or Sutherland-Hodgman polygon clipping.

Additional features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 4 is a block diagram of an exemplary computer graphics system suitable for incorporating a geometry accelerator according to an embodiment of the present invention;

FIG. 8 is a flowchart exemplifying the operation of a clipping machine according to an embodiment of the present invention.

DETAILED DESCRIPTION

Figure 2A:
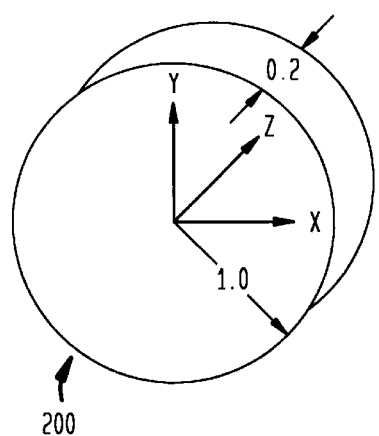
FIGS. 2A–J illustrate an automobile chassis rendered on a display device according to conventional graphics systems.
Figure 2B:
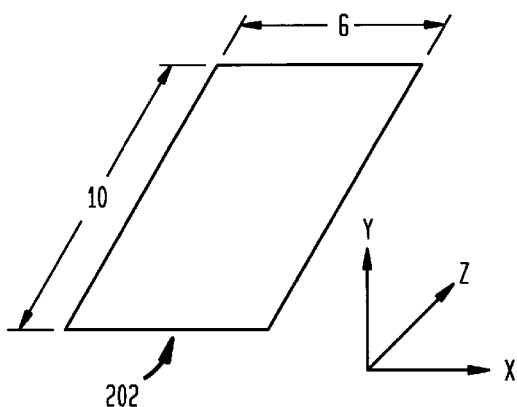
Figure 2C:
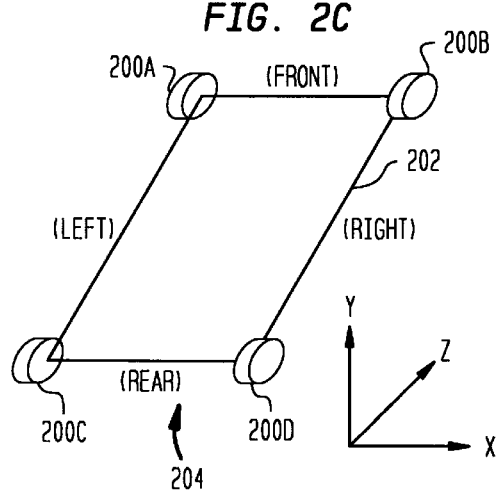
Figure 2D:
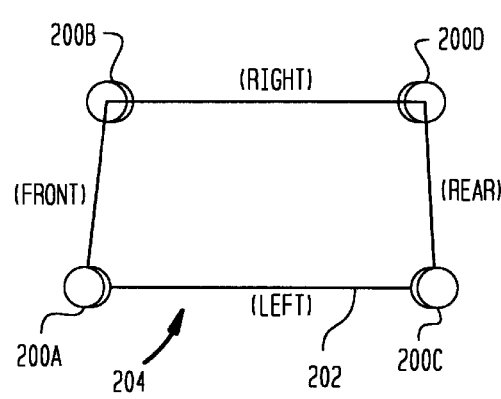
Figure 2E:
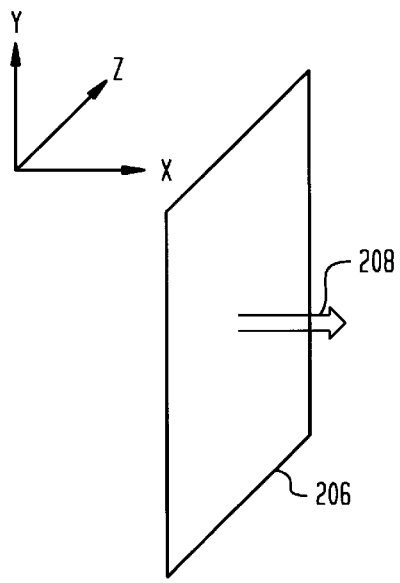
Figure 2F:
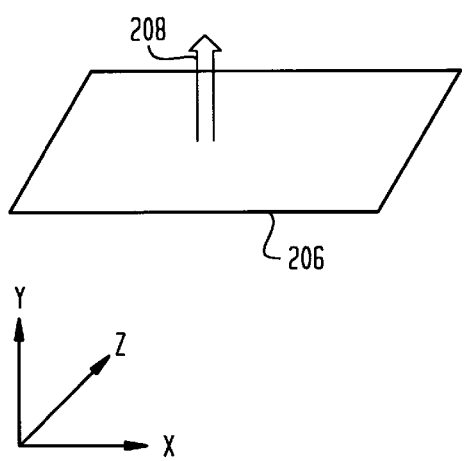
Figure 2G:
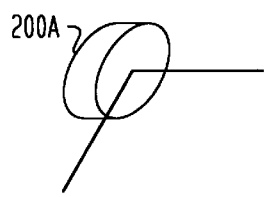
Figure 2H:
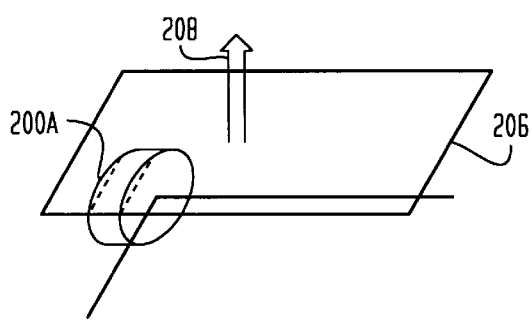
Figure 2I:
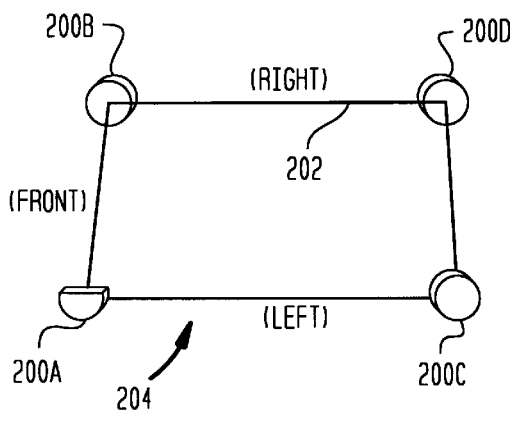
Figure 2J:
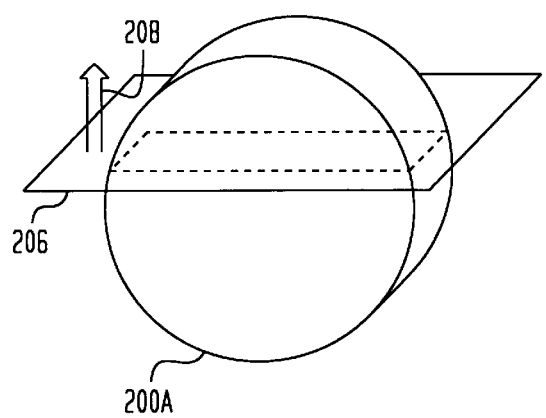
Figure 3A:
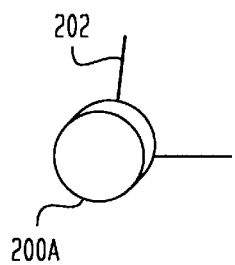
FIGS. 3A–C illustrate the automobile chassis of FIG. 2 rendered on a display device according to an aspect of the present invention.
Figure 3B:
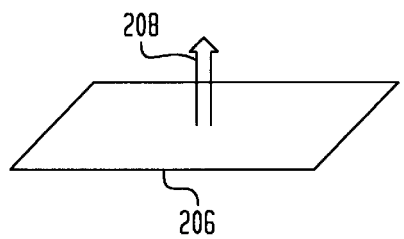
Figure 3C:
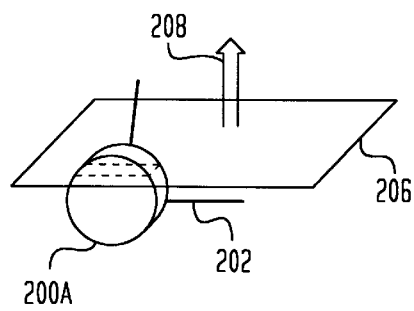

To facilitate an understanding of the present invention, reference is now made to FIGS. 2A–2J which depict an exemplary automobile chassis 204 rendered on conventional computer graphics systems, and FIGS. 3A–3C which depict the automobile chassis 204 rendered on a computer graphics system according to the present invention. The terminology used in this application to describe coordinate spaces corresponds to that used in OpenGL. It should be noted that other API's may use different terminology to describe similar coordinate spaces.

In FIG. 2A, a user creates a wheel 200 out of a cylinder in object space 108, which is the space in which objects and model clipping planes are generally defined. The wheel 200 is defined to be one unit in radius and 0.2 units deep, centered about the origin. The user then defines, in object space 108, the automobile frame 202 out of a rectangle that is 6 units wide and 10 units long, as depicted in FIG. 2B. FIG. 2C illustrates the desired model in eye space 110, which is generally the space in which an entire model is assembled. The automobile frame 202 is transformed into eye space 110, with the origin of eye space 110 being defined to be the center of the frame 202.

To arrange each of the wheels 200 on the chassis 204, each wheel 200 must be transformed from object space 108 into eye space 110 using an appropriate modelview matrix (M) 100. For example, to place the right front wheel 200B, the modelview matrix needs to face the wheel 200 forward (i.e., rotate 90° about the Y axis), translate to the front of the frame 202 (i.e., translate 5 units in the Z axis), and translate the wheel 200 to the right hand side of the frame 202 (i.e., translate 3 units in the X axis). The graphics application program constructs the appropriate modelview matrix for placing the front right wheel 200B and then sends the modelview matrix to the graphics system driver. The application program then sends the vertex data defining the wheel (in object coordinates 108) to the graphics system driver. The graphics system driver multiplies the vertex data defining the wheel 200 by the modelview matrix and the right front wheel 200B is then drawn at the appropriate location in eye space 110 as shown in FIG. 2C. For the left front wheel 200A, the modelview matrix needs to face the wheel 200 forward (i.e., rotate 90° about the Y axis), invert the wheel 200 (i.e., face it left, rather than right, by scaling the wheel by −1 in X), translate the wheel 200 to the front of the frame 202 (i.e., translate 5 units in Z), and translate the wheel 200 to the left hand side of the frame 202 (i.e., translate −3 units in X). The graphics application program constructs the appropriate modelview matrix for placing the left front wheel 200A and provides this to the graphics system driver. The application program then sends the vertex data defining the wheel 200 to the graphics system driver, where it is then drawn at the appropriate location in eye space 110 as shown in FIG. 2C. The drawing of the rear wheels 200C and 200D proceeds similarly.

FIG. 2D illustrates the automobile chassis 204 in clipping space 112 after a projection matrix (P) has been used to define the location of the viewer in relation to the model chassis 204. As shown in FIG. 2D, the viewer is looking at the chassis 204 from above, with the left side of the chassis 204 in the foreground and the right side in the background, from a position that is centrally located between the front and rear of the chassis 204. After performing view clipping in clipping space 112, the vertices of the model are transformed into window space 116 (not shown) by applying the viewport (V) and device (D) matrices. The viewport matrix defines where the rendered drawing will appear in the user's window, and the device matrix defines where the window appears on the user's screen.

FIG. 2E illustrates a model plane 206 that is used to slice the top portion off the left front wheel 200A. The model clipping plane 206 is defined in object space 108 as noted in FIG. 2E, with the arrow 208 defining the half-space that is to be clipped away. The graphics application program needs to construct a modelview matrix that places this plane in the appropriate location, in eye coordinates 110. In this example, the plane is rotated 90° about the Z axis, so that objects above the clipping plane will be clipped out of the model, and it is translated 0.2 units along the Y axis, so that only the top portion of the wheel will be clipped away. The graphics application program constructs the appropriate modelview matrix (M) for the model clipping plane and sends it to the graphics system driver. The application program then sends the equation coefficients defining the model clipping plane 206 in object space 108 to the graphics system driver. The graphics system driver calculates the inverse transpose of the modelview matrix ($M^{-T}$) and uses this to transform the model clipping plane 206 from object space 108 to eye space 110 as shown in FIG. 2F. FIG. 2G shows the left front wheel 200A in eye space 110, and FIG. 2H shows the application of the model clipping plane 206 to the left front wheel 200A in eye space 110, where model clipping is defined according to OpenGL. After model clipping in eye space 110, the remaining model clipped vertex data is multiplied by the projection matrix (P) to transform the model to clipping 112, where view clipping is performed. After performing view clipping in clipping space 112, the vertices of the model are transformed into window space 116 by applying the viewport and device matrices (VD), and the resulting model appears as depicted in FIG. 2I.

A more sophisticated method of performing clipping is depicted in FIG. 2J. As shown in FIG. 2J, the model clipping plane 206 is back transformed into object coordinates 108 using the current modelview matrix (M) defined for the vertex data that defines the left front wheel 200A. Model clipping is performed in object space 108, and then, the remaining vertex data is transformed from object coordinates 108 to clip coordinates 112, where view clipping is performed. After performing view clipping, the view and model clipped vertex data is transformed into window coordinates 116 where it is displayed as shown in FIG. 2I.

FIGS. 3A–3C depict the same automobile chassis 204 rendered on a computer graphics system according to the present invention. Significantly, and in contrast to conventional graphics systems, view clipping and model clipping are performed in the same coordinate space. As shown in FIG. 3A, the left front wheel 200A is transformed into window space 116 using a concatenation of the current modelview, projection, viewport, and device transformation matrices (MPVD). The user specified-model clipping plane 206 is also transformed from eye space 110 into window space 116, as shown in FIG. 3B. This can be performed by multiplying the model clipping plane coefficients, in eye coordinates 110, by the inverse transpose of a concatenation of the current projection, viewport, and device transformation matrices $(PVD)^{-T}$. The graphics system then performs both view and model clipping in window coordinates 116 as depicted in FIG. 3C. Significantly, vertex data defining left front wheel 200A is transformed only once, into window space 116, rather than being transformed twice, as in conventional graphics systems. Further advantages of the present invention are discussed below.

FIG. 4 is a simplified block diagram of an exemplary computer graphics system 400 according to an aspect of the present invention. As shown, the graphics system 400 includes a front-end subsystem 402, a driver 404, a texture mapping subsystem 408, and a frame buffer subsystem 410. Driver 404 processes primitive data received from the host processor 406 over bus 416 and provides processed primitive data to the front-end subsystem 402 over bus 418 in a format suitable for use by the front-end subsystem 402. The processed primitive data provided to the front-end subsystem 402 includes vertex data for graphics primitives, as well as any user specified model clipping planes and any current transformation matrices that are associated with the graphics primitives. The graphics primitives are typically specified by X, Y, Z, and W object coordinate data and R, G, B, and α color data, and S, T, R, and Q texture data for portions of the graphics primitives, such as vertices.

Data representing the graphics primitives in three dimensions is provided by the front-end subsystem 402 to the frame buffer subsystem 410 over bus 422 to the optional texture mapping subsystem 408. The texture mapping subsystem 408 interpolates the received primitive data to compute the screen display pixels that will represent the primitive, and determine its corresponding resulting texture data for each primitive pixel. The resulting texture data is provided to the frame buffer subsystem 410 over one or more buses 422.

The frame buffer subsystem 410 interpolates the primitive data received from the front-end subsystem 402 to compute the pixels on the display screen that will represent each primitive, and to determine object color values and Z values for each pixel. The frame buffer subsystem 410 combines, on a pixel-by-pixel basis, the object color values with the resulting texture data provided from the optional texture mapping subsystem 408, to generate resulting image R, G, and B values for each pixel. R, G, and B color control signals for each pixel are respectively provided over R, G and B lines 416 to control the pixels of the display screen (not shown) to display a resulting image on the display screen that represents the texture-mapped primitive.

In accordance with the present invention, driver 404 is configured to interface with a number of different APIs, such as OpenGL, Starbase®, etc., that may be used by graphics application programs executing on the graphics system 400. (Starbase is a registered trademark of Hewlett-Packard Company). Driver 404 receives the primitive data generated by a graphics application program executing on the host processor 406 over bus 416. The primitive data received by driver 404 includes vertex data defining the graphics primitives in object coordinates 108, any user-specified model clipping planes in object coordinates 108, current modelview (M) and projection (P) transformation matrices associated with the graphics primitives in object coordinates 108, and viewport and window information pertaining to the user's display environment. Driver 404 processes the viewport and window information, converts this information into viewport (V) and device (D) transformation matrices, and provides a concatenated MPVD matrix to the front-end subsystem 402 over bus 418. Driver 404 also processes the model clipping planes and provides transformed model clipping planes, in window coordinates 116, to the front-end subsystem 402. Vertex data defining the graphics primitives is provided to front-end subsystem 402 without processing by driver 404. In a preferred embodiment of the present invention, driver 404 performs pre-processing on primitive data provided by the graphics application program in software, and executes on the host processor 406. However, driver 404 may also be implemented in hardware, for example, as a state machine, as known to one of ordinary skill in the art.

Advantageously, this pre-processing by the driver enables both view clipping and model clipping to be performed in hardware by the front-end subsystem 402.

The front-end subsystem 402 includes a distributor 412 and one or more three-dimensional geometry accelerators 414A–414P (collectively and generally referred to as geometry accelerators 414). As noted, the distributor 412 receives the coordinate data and other processed primitive data associated with the graphics primitive over bus 418 after processing by the driver 404. The distributor 412 dynamically allocates the processed primitive data, including vertex state (coordinate) and property state (color, lighting, etc.) data, among the geometry accelerators 414 and provides each geometry accelerator with processed primitive data over bus 426. Rendering data generated by the geometry accelerators 414 is provided over output bus 428 to distributor 412. Distributor 412 reformats the primitive output data (that is, rendering data) received from the geometry accelerators 414, reorders the rendering data if necessary, performs a floating point to fixed point conversion, and provides the primitive data stream over bus 420 to optional texture-mapping subsystem 408 and subsequently to frame buffer subsystem 410.

The texture mapping subsystem 408 and frame buffer subsystem 410 may be any well-known systems now or later developed. Furthermore, the front-end subsystem 402, texture mapping subsystem 408 and frame buffer subsystem 410 are preferably pipelined and operate on multiple primitives simultaneously. While the texture mapping subsystem 408 and the frame buffer subsystem 410 operate on primitives previously provided by the front-end subsystem 402, the front-end subsystem 402 continues to operate and provide new primitives until the pipelines in the subsystems 408 and 410 become full.

Figure 5:
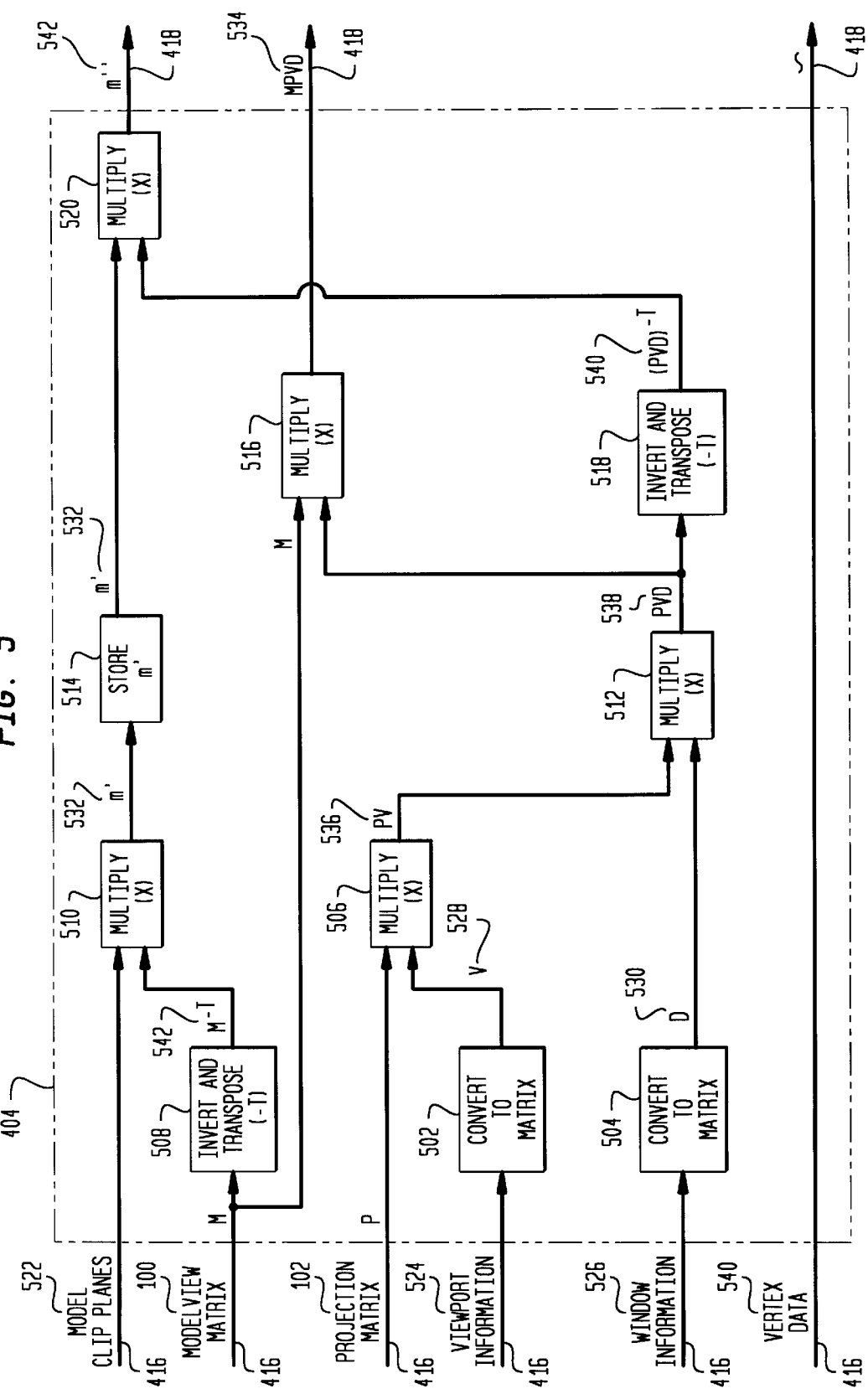
FIG. 5 is a functional block diagram of a driver that processes primitive data received from a graphics application programming interface according to an embodiment of the present invention.

FIG. 5 is a more detailed function block diagram of driver 404 according to an embodiment of the present invention. Driver 404 receives primitive data generated by a graphics application program executing on host processor 406 over bus 416. The primitive data includes model clip planes in object coordinates 522, a current modelview transformation matrix (M) 100, a current projection transformation matrix (P) 102, viewport information 524, window information 526, and vertex data 540 in object coordinates. The primitive data received by driver 404 is defined in terms of homogeneous coordinates. That is, all coordinates and spaces contain 4 values, one for each of X, Y, Z, and W. Similarly, the processed primitive data provided by driver 404 to the font-end subsystem 402 is also defined in terms of homogeneous coordinates and spaces.

Driver 404 receives the viewport information 524 defining where a model will appear in the user's window and converts this information to matrix form at block 502. Driver 404 also receives window information 526 defining where the window will appear on the user's device and converts this information to matrix form at block 504. Typically the device on which the model will be displayed is a display screen. However, the term "device" is used to convey that the display device may be any type of display device, including a printer or a plotter. Generally the viewport information 524 and the window information 526 do not change very frequently. However, when this information does change, for example, when a user modifies the window by moving it to another location on the display screen, blocks 502 and 504 will determine new viewport (V) 528 and device (D) matrices 530 based on the updated information, as appropriate.

Driver 404 receives the projection matrix (P) 102 from the graphics application program and multiplies (concatenates) this matrix by the viewport matrix (V) 528 at block 506. The concatenated PV matrix 536 is provided to block 512 where it is multiplied (concatenated) with the device matrix (D) 530 to generate a concatenated PVD matrix 538. At block 518 driver 404 inverts and transposes the concatenated PVD matrix 538 and provides the inverted and transposed concatenated PVD matrix $((PVD)^{-T})$ 540 to block 520. However, when the concatenated PVD matrix 538 is singular, that is, when the concatenated PVD matrix 538 can not be inverted, then clipping of graphics primitives can not be performed in hardware within the geometry accelerator because the $((PVD)^{-T})$ matrix 540 is undefined. Although such singularity is infrequent, when it occurs, it is typically due to singularity of the projection matrix (P) 102, such as when a particular coordinate dimension is scaled to zero. Thus, when the PVD matrix is singular, view and model clipping will instead be performed by the graphics application software.

When a model clipping plane (m) 522 is specified by the user, driver 404 receives the model clip plane equation coefficients A, B, C, and D in homogeneous object coordinates from the graphics application program. Driver 404 also receives the current modelview matrix (M) 100 that is associated with the model clipping plane 522. The driver 404 then inverts and transposes the associated modelview matrix (M) 100 for the model clipping plane at block 508 and provides the inverted and transposed modelview matrix $(M^{-T})$ 542 to block 510. At block 510 driver 404 multiplies the model clip plane equation coefficients by the inverted and transposed modelview matrix $(M^{-T})$ 542 to transform the model clipping plane (m) 522 into homogeneous eye coordinates 110. At block 514, driver 404 temporarily stores the model clipping plane defined in eye coordinates (m') 532 until vertex data 540 to which the model clipping plane is to be applied is received by driver 404.

Figure 1:
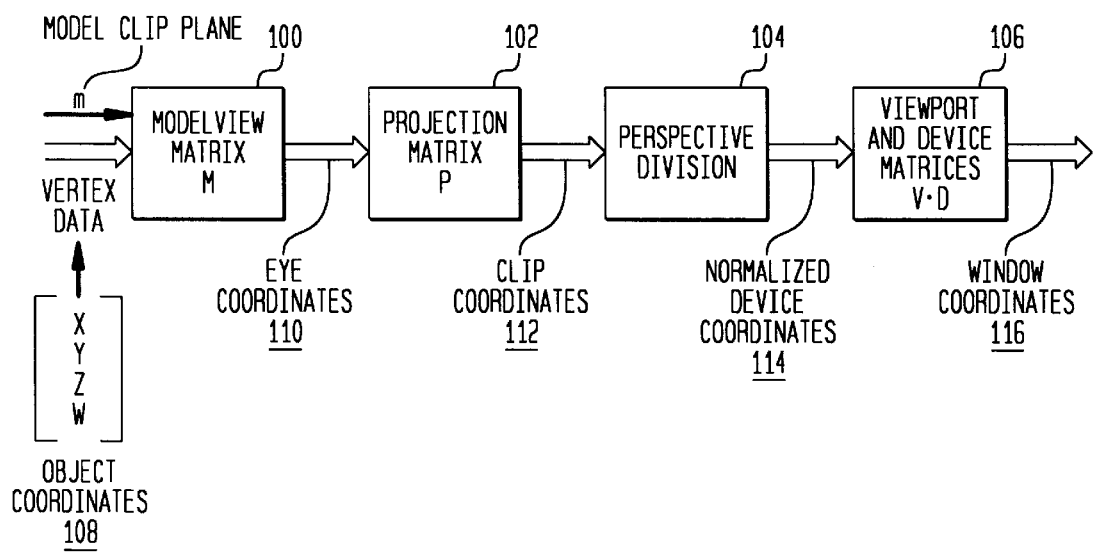
FIG. 1 is a block diagram illustrating different coordinate spaces in which graphical operations are performed.

When vertex data 540 of a graphics primitive is sent, driver 404 multiplies the modelview matrix (M) 100 currently associated with the graphics primitive by the concatenated PVD matrix 538 at block 516 to provide a concatenated MPVD matrix 534 that is associated with the graphics primitive. Driver 404 provides the concatenated MPVD matrix 534 and the associated vertex data 540 to the front-end subsystem 402 over bus 418. When the vertex data 540 of the graphics primitive is sent, driver 404 also multiplies the stored model clipping plane equation coefficients by the inverted and transposed concatenated PVD matrix $((PVD)^{-T})$ 540 to transform model clipping plane m' 532 into homogeneous window coordinates (m") 542. Driver 404 then provides the transformed model clipping plane (m") 542 to the front-end subsystem 402 over bus 418. It should be noted that the term "homogeneous window coordinates" is used here to distinguish from window coordinates 116 described with respect to FIG. 1. In particular, the term "homogeneous" is used to emphasize that perspective division 104 has not yet occurred.

Although it might be expected that a substantial amount of processing is involved in calculating the concatenated MPVD matrix 534 at block 516, driver 404 takes advantage of the fact that most of the elements in the viewport and device matrices are either 0 or 1. For example, when the viewport information 524 specifies a translation, most of the elements of the viewport matrix 528, other than those along the main diagonal are zero. Thus, when driver 404 multiplies the viewport matrix 528 by the projection matrix 102 at block 506, driver 404 does not need to multiply those elements of viewport and projection matrices whose product will be zero, thus saving considerable time. Similarly, driver 404 also takes advantage of the fact that most of the elements of the device matrix 530, other than those along the main diagonal, are zero. By reducing the amount of processing required to calculate the MPVD matrix 534, a substantial increase in performance is achieved.

Figure 6:
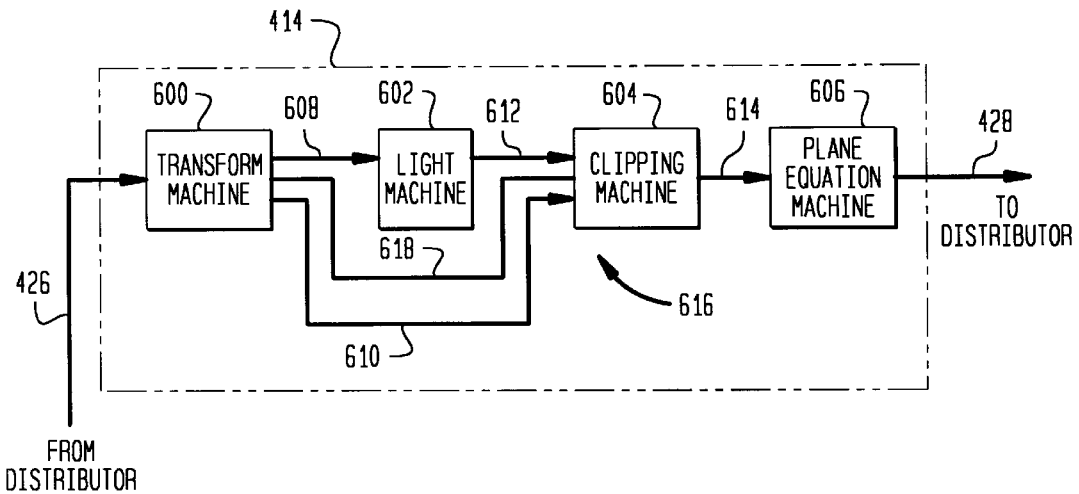
FIG. 6 is a block diagram of a geometry accelerator that includes a clipping machine according to an embodiment of the present invention.

FIG. 6 is a functional block diagram of a geometry accelerator 414 that includes a clipping machine 604 configured in accordance with the present invention. In this illustrative embodiment, the clipping machine 604 supports clipping on 6 view clipping planes and up to 6 user-defined model clipping planes at any orientation. As shown, the geometry accelerator 414 includes a number of specialized machines 616, including a transform machine 600, a light machine 602, a clipping machine 604, and a plane equation machine 606. Each of the specialized machines 616 is preferably implemented as a microprogrammed ROM with supporting cell logic.

Transform machine 600 receives the processed primitive data from the distributor 412 over bus 426. As noted, the processed primitive data includes vertex data 540 defining the graphics primitive in homogeneous object coordinates, any model clipping planes associated with the graphics primitive (m") 542 (in homogeneous window coordinates) and the concatenated MPVD matrix 534 that is associated with the graphics primitive. As noted, the term "homogeneous" is used to distinguish that perspective division has not occurred. Thus, the model clipping planes m" 542, vertex data 540, and MPVD matrix 534 includes values for X, Y, Z and W. Transform machine 600 transforms the vertex data 540 defining the graphics primitive from homogeneous object coordinates 108 into homogeneous window coordinates by multiplying each vertex by the concatenated MPVD matrix 534 associated with the graphics primitive. The transform machine 600 also calculates view clip codes and model clip codes for each vertex of the graphics primitive to determine whether the primitive may be trivially accepted or trivially rejected; that is, whether clipping of the graphics primitive is required to be performed by the clipping machine 604.

The calculation of clip codes and the determination of trivial acceptance and rejection is well known in the art, and, therefore is described only briefly herein. View clip codes for each vertex of the graphics primitive are calculated in a conventional manner by comparing vertex coordinate data to each of the 6 orthogonal view clipping planes (Xmax, Xmin, Ymax, Ymin, Zmax, Zmin). However, in contrast to conventional graphics systems, this comparison is performed in homogeneous window coordinates, rather than clip coordinates 112. Model clip codes for each vertex are also calculated in a conventional manner, by multiplying model clipping plane equation coefficients by vertex coordinate data for each vertex of the graphics primitive and comparing this value to zero. For example, when the plane equation Ax+By+Cz+Dw for a given model clipping plane acting on a given vertex (x, y, z, w) of the graphics primitive is negative, then that vertex is determined to be on the excluded side of the model clipping plane, and the corresponding clip code will be set. However, in contrast to conventional graphics systems, this determination is performed in homogeneous window coordinates, rather than in eye coordinates (as in OpenGL), or in object coordinates (as in other conventional systems).

When the clip codes indicate that each of the transformed vertices of the primitive lie within the clipping volume, then the primitive can be trivially accepted. Alternatively, when the clip codes indicate that each of the vertices of a primitive lie outside of one of the clipping planes of the clipping volume, then the primitive can be trivially rejected. When the primitive is trivially rejected, the transformed vertex data, the model clipping planes, and the concatenated MPVD matrix can be discarded by the transform machine 600 as it is completely outside the clipping boundaries.

However, when a primitive is not trivially rejected, the transformed vertex data is provided to the light machine 602 over bus 608. Any user-specified model clipping planes, in homogeneous window coordinates, that are associated with the graphics primitive are provided to the clipping machine 604 over bus 618. Based on the determination of trivial acceptance and rejection, the transform machine 600 provides control information to the clipping machine 604 via lines 610 indicating whether the primitive is to be view clipped, model clipped, view clipped and model clipped, or not clipped at all. The transform machine 600 provides two signals to the clipping machine 604 via lines 610 to control the operation of the clipping machine 604. The first signal, designated view_accept, indicates whether the primitive needs to be view clipped by the clipping machine 604. The second signal, designated model_accept, indicates whether the primitive needs to be model clipped by the clipping machine 604. When the view_accept signal is asserted, the primitive lies completely within the view clipping boundaries and, therefore, does not need to be view clipped. Likewise, when the model_accept signal is asserted, the primitive lies completely inside the model clipping boundaries and, therefore, does not need to be model clipped. When neither signal is asserted, the clipping machine 604 will be used to determine the intersections, if any, of the primitive with both the view clipping boundaries and the model clipping boundaries.

As noted, the light machine 602 receives transformed vertex data for graphics primitives that are not trivially rejected from the transform machine 600 via bus 608. The light machine 602 enhances image data by simulating light conditions, and provides the enhanced vertex data to the clipping machine 604 via bus 612. The clipping machine 604 receives the enhanced vertex data in homogeneous window coordinates from the light machine 602, and determines what form of clipping, if any, is to be performed, on the graphics primitive. The clipping machine 604 clips the primitive to the view clipping boundaries and/or model clipping boundaries in homogeneous window space and provides clipped (view clipped, model clipped, or both view clipped and model clipped) vertex data to the plane equation machine 606, via bus 614. In the event that the primitive is completely clipped away, that is, when no portion of the primitive is within the clipping boundaries, then no vertex data is provided to the plane equation machine 606. The plane equation machine 606 receives the clipped vertex data from the clipping machine 604 and calculates plane equations defining the clipped primitives in terms of mathematical floating point plane equations. Because the clipped vertex data is already in homogeneous window coordinates, further transformation of the clipped vertex data is unnecessary. The plane equations defining the clipped primitive are then provided to the distributor 428, wherein the distributor provides the rendering data to the texture mapping subsystem 408, and subsequently to frame buffer subsystem 410.

As may be appreciated by one of ordinary skill in the art, the transform machine 600 multiplies each vertex of a graphics primitive by the MPVD matrix 534 before any model clipping is performed. Thus, some amount of vertex data that would not have been transformed into window coordinates 116 by a conventional graphics system is in fact transformed. However, the performance advantages associated with performing both view clipping and model clipping of graphics primitives in hardware within the geometry accelerator 414 significantly outweigh the additional time spent transforming vertex data that is ultimately clipped away. Furthermore, because this transformation is performed in hardware by the transform machine 600, rather than in software, the impact of this extra amount of processing is further diminished.

A preferred embodiment of a geometry accelerator 414 that includes a clipping machine 604 that performs both view and model clipping of complex graphics primitives in a minimal amount of memory is described in detail in U.S. Pat. No. 5,877,773 entitled "Multi-Pass Clipping in a Geometry Accelerator", with and naming as inventors Theodore G. Rossin, Glenn W. Strunk and Edmundo Rojas, which is herein incorporated by reference in its entirety. Accordingly, discussion of the various techniques by which clipping of graphics primitives can be performed, which is described in the aforementioned application, is omitted herein.

Figure 7:
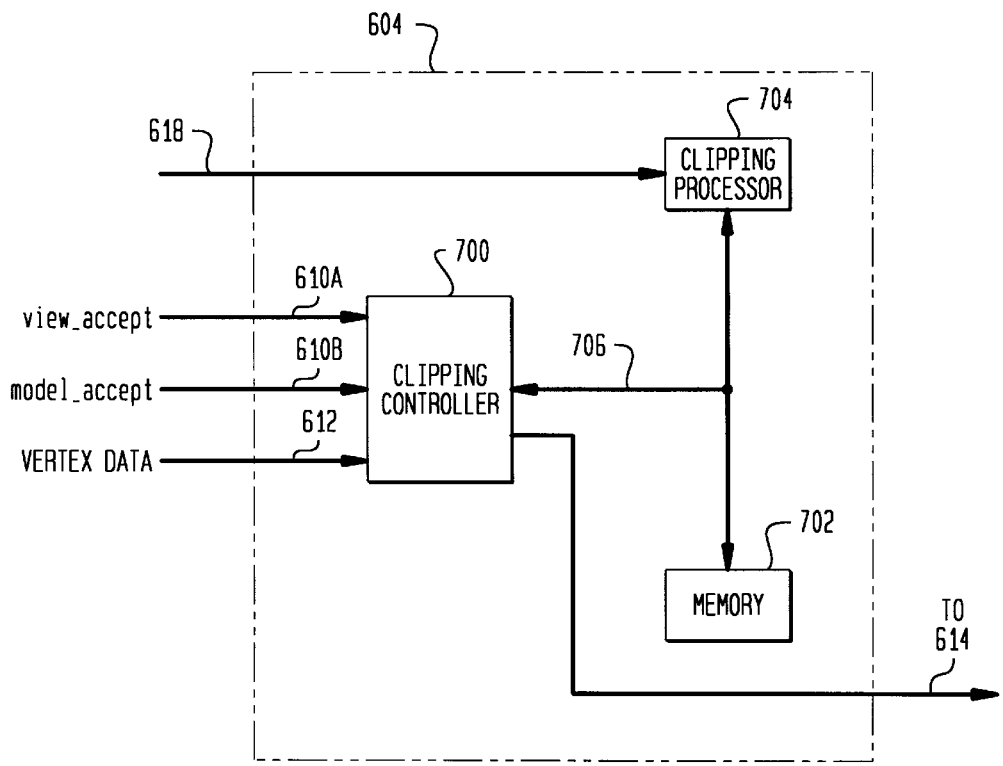
FIG. 7 is a block diagram of a clipping machine according to an embodiment of the present invention.

FIG. 7 is a schematic block diagram of one embodiment of the clipping machine 604 according to the present invention. The clipping machine 604 includes a clipping controller 700, a memory 702 for storing light enhanced vertex data and clipped (view and model clipped) light enhanced vertex data, and a clipping processor 704 (hereafter termed "a clipper"). The clipper 704 performs clipping in accordance with conventional clipping techniques according to any of the well known clipping algorithms, such as Cohen-Sutherland line clipping, parametric line clipping, Weiler polygon clipping, Liang-Barsky polygon clipping, and Sutherland-Hodgman polygon clipping. However, clipper 704 differs from conventional clippers in that it performs both view clipping and model clipping in homogeneous window coordinates. Because clipper 704 performs view and model clipping in the same coordinate space, only a single clipper is required within the geometry accelerator 414. Significantly, this reduction in the amount of hardware permits view and model clipping to be performed in hardware without sacrificing other functions, such as those performed by light machine 602 and plane equation machine 606. Furthermore, because view clipping and model clipping are performed in hardware within the geometry accelerator, other functions that are performed prior to clipping, such as vertex transformation, can also be implemented in hardware. Because each of these functions are performed in hardware within a single geometry accelerator, substantial performance advantages are achieved over conventional graphics systems.

The clipping controller 700, the memory 702, and the clipper 704 communicate with each other over bus 706. In a preferred embodiment, the memory 702 is a fast memory accessible by both the clipping controller 700 and the clipper 704. However, memory 702 need not be implemented within the clipping machine 604 as depicted in FIG. 7, but may be located anywhere within the geometry accelerator 414. The clipping controller receives the control information (view_accept, and model_accept) via lines 610A and 610B, and the light-enhanced vertex data via bus 612, and provides clipped vertex data to the plane equation machine 606 over bus 614.

The clipping controller 700 stores the light-enhanced vertex data defining the input primitive in memory 702. Dependent on the control information received from the transform machine 600 over lines 610, the operation of the clipping controller 700 will vary. For example, when the control information indicates that no clipping need be performed, that is, the input primitive lies completely within the view clipping boundaries and the model clipping boundaries (if any), the clipping controller 700 simply provides the light-enhanced vertex data to the plane equation machine 606. Alternatively, when the control information indicates that only one of view clipping, or model clipping is to be performed, the clipping controller 700 selects the appropriate intersection equations and clip codes for the clipper 704 to use and instructs the clipper 704 to determine the intersections of the input primitive, if any, with the appropriate clipping boundaries. The clipper 704 receives plane equations, in homogeneous window coordinates, for view clipping boundaries and/or any user specified model clipping boundaries over bus 618. The clipper 704 clips the input primitive (defined by the light enhanced vertex data stored in memory 702) according to the equations set by the clipping controller 700, and stores clipped vertex data in the memory 702. When control is returned to the clipping controller 700, the clipping controller 700 provides the clipped vertex data to the plane equation machine 606.

When the control information indicates that both view clipping and model clipping are to be performed, the clipping controller 700 will instruct the clipper 704 to perform view clipping and model clipping on the input graphics primitive. As noted, the clipper 704 will perform both view clipping and model clipping in homogeneous window coordinates. If the amount of memory 702 is sufficient to store the light enhanced input vertex data, the view clipped vertex data, and the model clipped vertex data, clipping controller 700 instructs the clipper 704 to view clip the input vertex data against each of the view clipping planes that define the view volume in homogeneous window coordinates. Clipping controller 700 selects the appropriate intersection and clip code equations for the clipper 704 to use (i.e., view clip code equations and view clipping intersection equations) and calls the clipper 704 to determine the intersections of the edges of the input graphics primitive with each of the view clipping planes. The clipper 704 stores the resulting view clipped vertex data in the memory 702. The clipping controller 700 then selects model clip code equations and model clipping intersection equations for the clipper to use and instructs the clipper 704 to model clip the view clipped vertex data against each of the user defined model clipping planes (defined in homogeneous window coordinates). The clipper 704 determines the intersections of the edges of the view clipped vertex data with each of the user defined model clipping planes and stores the resulting view and model clipped vertex data, if any, in the memory 702. The clipping controller 700 then provides the resulting view and model clipped vertex data to the plane equation machine 606 over bus 614. If the amount of memory 702 is not sufficient to store the light enhanced input vertex data and the view clipped vertex data and the model clipped vertex data, then the clipping controller 700 may implement a multi-pass clipping routine as described in the aforementioned related application.

FIG. 8 is a flowchart exemplifying the operation of the clipping machine 604 according to an embodiment of the present invention. The clipping controller 700 receives the light-enhanced vertex data, in homogeneous window coordinates from the light machine 602 and control information from the transform machine 600 at block 800. At block 802 the clipping controller 700 determines whether view clipping, model clipping, or both view clipping and model clipping will be performed based on the state of the control signals view_accept and model_accept. When the control information indicates that the input primitive is to be view clipped, or model clipped, but not both, the clipping controller 700 proceeds to block 804. At block 804 the clipping controller 700 determines whether view clipping is to be performed, based on the state of the view_accept signal. When view clipping is to be performed, the clipping controller 700 proceeds to block 806, wherein the clipping controller 700 selects clip code equations and intersection equations for view clipping. At block 808 the clipper 704 is called and instructed to view clip the input vertices. The clipper 704 determines the intersection of the input primitive with the view clipping boundaries and stores the view clipped vertex data in the memory 702. At block 826, the clipping controller 700 outputs the view clipped vertices to the plane equation machine 606, and clipping is complete.

Alternatively, when it is determined at block 804 that view clipping is not to be performed, then necessarily model clipping is to be performed. At block 810 the clipping controller 700 selects clip code equations and intersection equations for model clipping. At block 812 the clipper 704 is called and instructed to model clip the input vertices. The clipper 704 determines the intersection of the input primitive with the model clipping boundaries, as defined by model plane equation coefficients, in homogeneous window coordinates, and stores the model clipped vertex data in the memory 702. At block 826, the clipping controller 700 outputs the model clipped vertices to the plane equation machine 606, and clipping is complete.

When it is determined at block 802 that both view and model clipping are to be performed, the clipping controller 700 proceeds to block 814. At block 804 the clipping controller 700 determines whether the amount of memory allocated to storing vertex data for clipping is sufficient to perform both view clipping and model clipping without overwriting any view clipped vertex data with model clipped vertex data. When the amount of memory allocated for storing vertex data is insufficient, the clipping controller 700 proceeds to block 816, where a multi-pass model clipping routine can be performed. Such a multi-pass clipping routine is described in the aforementioned, related application. When it is determined at block 814 that the amount of memory allocated to storing vertex data is sufficient, the clipping controller 700 proceeds to block 818.

At block 818 the clipping controller 700 selects clip code equations and intersection equations for view clipping and proceeds to block 820. At block 820 the clipper 704 is called and instructed to view clip the input vertices. The clipper 704 determines the intersection of the input primitive with the view clipping boundaries and stores the view clipped vertex data in the memory. At block 822 the clipping controller 700 selects clip code equations and intersection equations for model clipping and proceeds to block 824. At block 824 the clipper 704 is called and instructed to model clip the view clipped vertices. The clipper 704 determines the intersection of the view clipped vertices with the model clipping boundaries, and stores the view and model clipped vertex data in the memory 702. At block 826, the clipping controller 700 outputs the view and model clipped vertices to the plane equation machine 606, and clipping is complete.

As can be appreciated by the foregoing description, because the view clipping and model clipping are performed in the same coordinate space, the same clipper 704 can be used to perform view clipping and model clipping. Moreover, if it is known that there is sufficient memory to store all vertex data required for clipping, then blocks 814 and 816 can be omitted.

Although the flowchart of FIG. 8 was described with respect to a clipping machine 604 implemented within a geometry accelerator 414, one of ordinary skill in the art will appreciate that view clipping and model clipping may be performed in the same coordinate space in software, rather than in hardware. Regardless of whether coordinate transformation and clipping are performed in software or hardware, the present invention reduces the amount of transformation that is needed to perform clipping. For example, in OpenGL, vertex data needs to be separately transformed into eye space to perform model clipping. The model clipped vertex data is then transformed into clipping space to perform view clipping, and then the resulting view and model clipped data is finally transformed into window space for display. Even in more sophisticated graphics systems, model clipped vertex data is separately transformed into clipping space for view clipping, and then separately transformed into window space for display. However, embodiments according to the present invention only need to transform vertex data once, into window space, which is a transformation that is ordinarily required for display. Thus, no additional transformations of vertex data are needed above and beyond those required ordinarily for display.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A geometry accelerator for use in a computer graphics system comprising:
    a clipping processor that performs view clipping and model clipping of a graphics primitive in a same coordinate space.

2. The geometry accelerator of claim 1, further comprising:
    a transform machine constructed and arranged to receive vertex data defining the graphics primitive in object coordinate space and to transform the vertex data into said same coordinate space.

3. The geometry accelerator of claim 1, wherein said geometry accelerator transforms vertex data defining the graphics primitive from a first coordinate space to said same coordinate space, and transforms one or more model clipping planes from a second coordinate space to said same coordinate space.

4. The geometry accelerator of claim 3, wherein the computer graphics system includes a driver for receiving primitive data associated with the graphics primitive and providing a transformation matrix to said transform machine to transform the vertex data defining the graphics primitive into the homogeneous window coordinate space.

5. The geometry accelerator of claim 1, wherein said clipping machine performs view clipping and model clipping of the graphics primitive in a homogeneous window coordinate space.

6. A method for clipping a graphics primitive, the method comprising the steps of:
    determining an intersection of the graphics primitive with any of at least one view clipping plane in a first coordinate space; and
    determining an intersection of the graphics primitive with any of at least one model clipping plane in said first coordinate space.

7. The method of claim 5, further comprising steps of:
    receiving vertex data in an object coordinate space; and
    transforming the vertex data defining the graphics primitive from said object coordinate space into said first coordinate space.

8. The method of claim 7, wherein said at least one model clipping plane is defined in eye coordinate space, the method further comprising a step of:
    transforming the at least one model clipping plane from eye coordinate space into said first coordinate space.

9. The method of claim 8, wherein said step of transforming said at least one model clipping plane comprises the steps of:
    receiving primitive data associated with the graphics primitive, the primitive data including a projection matrix, viewport information, and window information;
    converting the viewport information into a viewport matrix;
    converting the window information into a device matrix;
    concatenating said projection matrix, said viewport matrix and said device matrix to form a first concatenated matrix;
    inverting and transposing said first concatenated matrix; and
    multiplying said at least one model clipping plane by said inverted and transposed first concatenated matrix, thereby transforming said at least one model clipping plane from said object coordinate space into said first coordinate space.

10. The method of claim 9, wherein the primitive data associated with the graphics primitive includes a modelview matrix, and wherein said step of transforming the vertex data comprises the steps of:
    concatenating said first concatenated matrix with said modelview matrix to form a second concatenated matrix; and
    multiplying said vertex data by said second concatenated matrix to transform said vertex data from said object coordinate space into said first coordinate space.

11. The method of claim 7, wherein said at least one model plane is defined in said object coordinate space, the method further comprising a step of:
    transforming the at least one model clipping plane from said object coordinate space into said first coordinate space in response to said step of receiving the vertex data.

12. The method of claim 6, further comprising a step of:
    selecting equations to determine the intersection of the graphics primitive with one of said at least one view clipping plane and said at least one model clipping plane.

13. A computer graphics system comprising:
    a clipping processor constructed and arranged to perform view clipping and model clipping of graphics primitives in a window coordinate space, said clipping processor performing view clipping in the window coordinate space when the graphics primitive intersects at least one view clipping plane, and performing model clipping of the graphics primitive in the window coordinate space when the graphics primitive intersects at least one model clipping plane.

14. The computer graphics system of claim 13, further comprising:
    a geometry accelerator, wherein said clipping processor is implemented in a single clipping machine within said geometry accelerator.

15. The computer graphics system of claim 14, wherein said geometry accelerator further comprises:
    a transform machine that receives vertex data defining each of the graphics primitives in object coordinate space and a transformation matrix, and wherein said transform machine is constructed and arranged to transform the vertex data into the window coordinate space using said transformation matrix.

16. The computer graphics system of claim 15, further comprising:

a driver that provides the vertex data and the transformation matrix to said transform machine, wherein said driver is constructed and arranged to transform each at least one model clipping plane into the window coordinate space.

17. A method of processing vertex data defining a graphics primitive on a computer graphics system, comprising the steps of:

transforming the vertex data from a first coordinate space to a second coordinate space;

view clipping the graphics primitive in said second coordinate space to generate view clipped vertex data;

model clipping said view clipped vertex data in said second coordinate space to generate view and model clipped vertex data; and displaying said view and model clipped vertex data on the computer graphics system without further transforming said view and model clipped vertex data.

18. The method of claim 17, further comprising a step of:

transforming a model clipping plane from said first coordinate space to said second coordinate space.

19. The method of claim 18, wherein the step of transforming the clipping plane includes steps of:

receiving primitive data associated with said graphics primitive, said primitive data including a projection matrix, viewport information, and window information;

converting said viewport information into a viewport matrix;

converting said window information into a device matrix;

concatenating said projection matrix, said viewport matrix and said device matrix to form a first concatenated matrix;

inverting and transposing said first concatenated matrix; and multiplying said at least one model clipping plane by said inverted and transposed first concatenated matrix.

20. The method of claim 19, wherein the primitive data associated with the graphics primitive includes a modelview matrix, and wherein said step of transforming the vertex data includes steps of:

concatenating said first concatenated matrix with said modelview matrix to form a second concatenated matrix; and multiplying said vertex data by said second concatenated matrix.

21. The geometry accelerator of claim 3, wherein said same coordinate space is homogeneous window coordinate space.

22. The method of claim 6, wherein said first coordinate space is a homogeneous window coordinate space.

23. A graphics system for processing primitive data including viewport information and window information, the system comprising:

a driver constructed and arranged to generate a transformation matrix for use in transforming vertex data defining graphics primitives into homogeneous window coordinate space, said driver converting the viewport information into a viewport matrix and the window information into a device matrix.

24. The system of claim 23, wherein the primitive data further includes a projection matrix, and wherein said driver concatenates the projection matrix, viewport matrix and the device matrix to form said transformation matrix.

25. The system of claim 24, wherein the primitive data further includes a modelview matrix, and wherein said driver concatenates the modelview matrix, the projection matrix, the viewport matrix, and the device matrix to form said transformation matrix.

26. The system of claim 24, wherein the primitive data further includes at least one model clipping plane, and wherein said driver transforms coefficients of the at least one model clipping plane into the homogeneous window coordinate space.

27. The system of claim 23, further comprising:

a geometry accelerator including a clipping machine that performs view clipping and model clipping of a graphics primitive in a same coordinate space.

28. The system of claim 27, wherein said geometry accelerator further comprises:

a transform machine for receiving vertex data defining the graphics primitive in a first coordinate space and transforming the vertex data into a second coordinate space;

a light machine for enhancing the transformed vertex data by simulating lighting conditions of the graphics primitive and providing light enhanced transformed vertex data to said clipping machine; and a plane equation machine for receiving clipped vertex data from said clipping machine and calculating plane equations defining geometries formed by the clipped vertex data.

29. The system of claim 28, wherein said transform machine transforms the vertex data defining the graphics primitive into a homogeneous window coordinate space.

30. The system of claim 23, wherein said same coordinate space is the homogeneous window coordinate space.

31. The geometry accelerator of claim 3, wherein said first coordinate space is object coordinate space.

32. The geometry accelerator of claim 3, wherein said second coordinate space is eye coordinate space.

33. The geometry accelerator of claim 31, wherein said second coordinate space is eye coordinate space.

34. The geometry accelerator of claim 31, wherein said geometry accelerator multiplies each vertex of the graphics primitive by a modelview matrix, a projection matrix, a viewport matrix and a device matrix to transform the vertex data from said object coordinate space to said homogenous window coordinate space.

35. The geometry accelerator of claim 34, wherein said modelview, projection, viewport and device matrices are concatenated into a single MPVD matrix.

36. The geometry accelerator of claim 33, wherein said geometry accelerator multiplies said at least one model clipping plane by inverted and transposed projection, viewport and device matrices to transform said model clipping planes from said eye coordinate space to said homogeneous window coordinate space.

37. The geometry accelerator of claim 36, wherein said inverted and transposed projection, viewport and device matrices are concatenated into a $(PVD)^{-T}$ matrix.

38. The geometry accelerator of claim 2, further comprising:

a light machine, interposed between said transform machine and said clipping machine, said light machine constructed and arranged to enhance said transformed vertex data by simulating lighting conditions of the graphics primitive and providing said light enhanced transformed vertex data to said clipping processor.

39. The geometry accelerator of claim 2, further comprising:
a plane equation machine constructed and arranged to receive clipped vertex data from said clipping processor and to calculate plane equations defining geometries formed by said clipped vertex data.

40. A graphics system comprising:
a geometry accelerator constructed and arranged to perform view clip and model clip operations on a graphics primitive in a same coordinate space,
wherein said view clip operations are performed when the graphics primitive intersects at least one view clipping plane and wherein said model clip operations are performed when the graphics primitive intersects at least one model clipping plane.

41. The graphics system of claim 40, wherein said geometry accelerator transforms vertex data defining the graphics primitive from a first coordinate space to said same coordinate space and transforms one or more model clipping planes including said at least one model clipping plane from a second coordinate space to said same coordinate space.

42. The graphics system of claim 41, wherein said same coordinate space is homogeneous window coordinate space.

43. The graphics system of claim 42, further comprising:
a driver for receiving the vertex data and for providing a transformation matrix to said geometry accelerator to transform the vertex data from said first coordinate space into said homogeneous window coordinate space.

44. The graphics system of claim 41, wherein said first coordinate space is object coordinate space.

45. The graphics system of claim 44, wherein said second coordinate space is eye coordinate space.

46. The graphics system of claim 43, wherein the vertex data includes viewport information and window information, and wherein said driver converts the viewport information into a viewport matrix and converts the window information into a device matrix.

47. The graphics system of claim 46, wherein the primitive data further includes a modelview matrix and a projection matrix, and wherein said driver concatenates the modelview matrix, the projection matrix, the viewport matrix, and the device matrix to form said transformation matrix.

48. The graphics system of claim 17, wherein the primitive data further includes at least one model clipping plane, and wherein said driver transforms coefficients of said at least one model clipping plane into said homogeneous window coordinate space.

* * * * *

UNITED STATES PATENT AND TRADEMARK OFFICE
CERTIFICATE OF CORRECTION

PATENT NO. : 6,137,497
DATED : October 24, 2000
INVENTOR(S) : Glenn W. Strunk et al.

It is certified that error appears in the above-identified patent and that said Letters Patent is hereby corrected as shown below:

Column 5,
Line 42, after "eye space" delete ","
Line 42, after "window space" insert -- , --

Column 9,
Line 57, after "art." do not begin a new paragraph

Column 17,
Line 60, delete "claim 5" and insert therefor -- claim 6 --

Column 19,
Line 28, after "forming the" insert -- model --

Column 22,
Line 22, delete "claim 17" and insert therefor -- claim 47 --

Signed and Sealed this

Twenty-fourth Day of September, 2002

Attest:

Attesting Officer

JAMES E. ROGAN
*Director of the United States Patent and Trademark Office*